April 10, 1962 R. H. POPPER 3,028,701

BOOK POSITIONING APPARATUS

Filed Oct. 14, 1960 3 Sheets-Sheet 1

INVENTOR.
ROBERT H. POPPER
BY
Krazinski & Nolan
ATTORNEYS

INVENTOR.
ROBERT H. POPPER
BY Krazinski + Nolan
ATTORNEYS

April 10, 1962 R. H. POPPER 3,028,701

BOOK POSITIONING APPARATUS

Filed Oct. 14, 1960 3 Sheets-Sheet 3

INVENTOR.
ROBERT H. POPPER
BY Krazinski & Nolan
ATTORNEYS

United States Patent Office 3,028,701
Patented Apr. 10, 1962

3,028,701

BOOK POSITIONING APPARATUS

Robert H. Popper, 231 Exeter Way, Hillside, N.J.

Filed Oct. 14, 1960, Ser. No. 62,687
10 Claims. (Cl. 45—58)

The present invention relates to book positioning apparatus and, more particularly, to such apparatus adapted for use within a telephone booth for positioning a telephone directory to enable the same to be fully opened and easily read.

In the past few years both indoor and outdoor telephone booths have greatly increased in number. Such booths usually are single units, rather than groups of a number of booths, which might justify a desk with a set of telephone directories, such as installed with a group of conventional indoor booths. At first, the lack of at least a local telephone directory did not present a serious problem, because a person who required help to obtain the telephone number to be called would simply request the number from "Information." However, with the great increase in the number of outdoor telephone booths, subway station installations and the like, "Information" was burdened with more requests than could be handled without an increase in the staff of information telephone operators at the central stations.

The conventional so called outdoor telephone booth of the latest type comprises back and side walls, a front door, a shelf between the back and the right side walls, and coin operated telephone apparatus mounted above the shelf.

In an attempt to at least install a local telephone directory in each booth to minimize information requests, a telephone directory book mounting device was provided which comprises a pocket in the corner provided by the left side and back walls in which a book with soft covers was normally mounted with its binding facing the back wall, its front cover practically flush with the left side wall and its top surface facing upwardly, and a flexible element connected to the book adjacent the upper end of the binding and to the booth to enable the book to be swung upwardly 90° and laid across the structure providing the pocket, whereby the book can be partially opened if squeezed into the corner of the booth. With this arrangement the book became mutilated rapidly and was vulnerable to vandalism because the flexible element could be easily ripped out, whereby many booths were with books that were difficult to read or without books.

In another attempt to at least install a local telephone directory book in each booth and overcome damage to the book and prevent vandalism, the book was placed in a holder provided with a horizontal pivot above the binding to enable the book to be swung upwardly 90° and be opened. With this arrangement, the pages at the left could at best be placed only in a vertical position by reason of the proximity of the left wall of the booth to the book, whereby it was difficult to read these pages. Also, unless the book was held securely, it had a tendency to fall back into the pocket.

In a more recent attempt to at least install a local telephone directory book in each booth, a directory mounting device was provided which comprises a pocket in the corner provided by the back and left side walls in which the book was normally mounted between stiff covers with its binding facing upwardly, its front cover practically flush with the left side wall and its bottom facing the back wall, and a pivotally mounted directory holder which enables the directory book to be rotated about 180°, so that its binding faces downwardly and the directory can be opened. Here again the pages at the left could at best be placed only in a vertical position by reason of the proximity of the left wall of the booth to the directory, whereby it was extremely difficult for persons to read the pages at the left.

As a result of these prior arrangements, many wrong numbers were dialed or requested and telephone operators were harassed, and information requests were not minimized to a tolerable level.

Accordingly, an object of the present invention is to provide book positioning apparatus particularly adapted for use in connection within telephone booths, which apparatus is not subject to the prior difficulties and disadvantages.

Another object is to provide such apparatus that enables a telephone directory to be fully opened, so that both sides of the pages thereof can be seen clearly and read without difficulty.

Another object is to install such apparatus so that the information desired in the telephone directory is in full view of the person while making the call.

Another object is to install such apparatus in a location within the telephone booth without materially reducing the space which a person using the telephone would occupy.

Another object is to provide such apparatus wherein the conventional book holder of the latest type now in use can be utilized.

A further object is to provide such apparatus which is simple, practical and economical in construction.

Other and further objects will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming a part of the specification, wherein.

Figure 1:
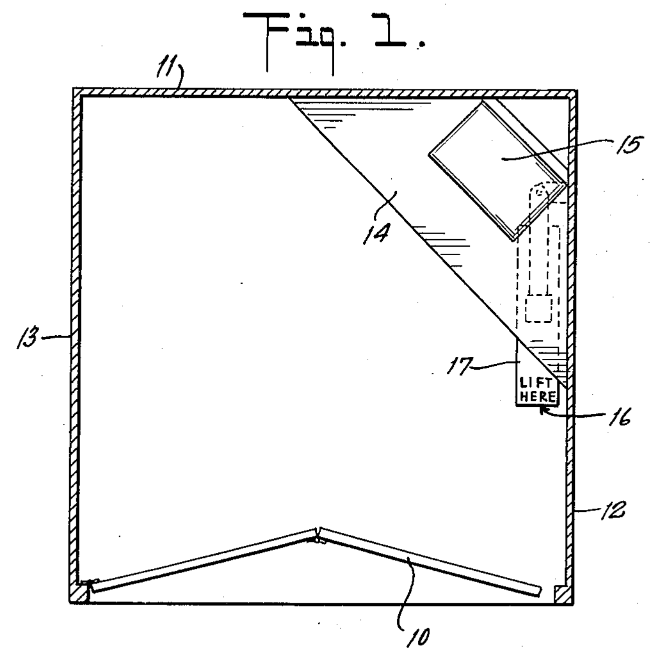
FIG. 1 is a sectional view of a conventional telephone booth looking downwardly just below the roof thereof.

Referring now to the drawings in detail and more particularly to FIG. 1 thereof, there is shown a conventional telephone booth comprising a front door 10, a back wall 11, a right side wall 12, a left side wall 13, a generally triangular shelf 14 diagonally mounted between or in the corner provided by the right side wall and the back wall, coin operated telephone apparatus 15 above the shelf, shown schematically, and apparatus 16, in accordance with the present invention located beneath the shelf, for positioning a telephone directory book 17.

Figure 2:
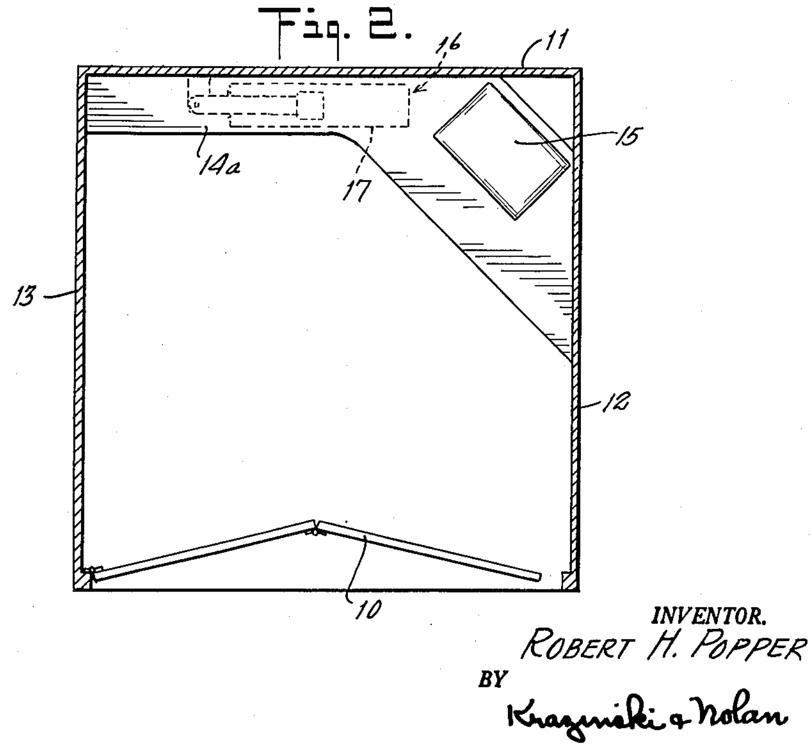
FIG. 2 is a sectional view of a modified telephone booth looking downwardly just below the roof thereof.

In FIG. 2, a slightly modified booth is shown which differs from the booth shown in FIG. 1 in that a narrow shelf 14*a* extends across the back wall 11 of the booth and beneath the telephone, and that the directory book is suspended beneath the shelf 14*a* with its back cover facing the back wall 11.

The apparatus 16 in its preferred form (FIGS. 3–6) generally comprises a book holder 18 having stiff front and back covers 19 and 20, first means for pivotally supporting the book holder for rotation of the book in a vertical plane and for normally positioning the book with its binding facing upwardly, second means for mounting the first means for rotation in a substantially horizontal plane, and drive means interconnecting the first and second means to effect rotation of the second means by rotation of the book to a position with its binding facing downwardly and resting on the shelf 14 and to effect rotation of the second means to a position whereby the book can be fully opened while at least a portion of the book holder is resting on the shelf.

As shown in FIGS. 3 to 6, such apparatus preferably comprises a bracket 21 secured to the right side wall 12 beneath the shelf 14, a gear 22 mounted on the bracket, a stud 24 at the center of the gear, an arm 25 having one end mounted on the stud for rotation with respect to the gear 22, a lengthwise extending shaft 26 journalled for rotation on the arm, a first gear 27 at one end of the shaft 26 in mesh engagement with the fixed gear 22, a second gear 29 at the other end of the shaft 26, a shaft 30 fixed to a pair of vertically spaced apart members 28 of the book holder 18 and rotatably supported by the arm 25 at its free end opposite the end mounted on the stud 24, and a gear 31 secured to the shaft 30 and in mesh with the gear 29.

The arm 25 preferably is a substantially U-shaped member which comprises upper and lower substantially horizontal portions 32 and 34 each rotatably mounted on the stud 24, a vertical portion 35 connecting the horizontal portions, a vertical strut 36 connecting the horizontal portions between the ends thereof, the shaft 26 being journalled for rotation in the strut 36 and the vertical portion 35, and a pair of spaced apart horizontal portions 37 secured on the portion 35 for rotatably supporting the shaft 30.

The lower horizontal portion 34 has an opening 39 through which a portion of the gear 27 extends to mesh with the gear 22.

Figure 3:
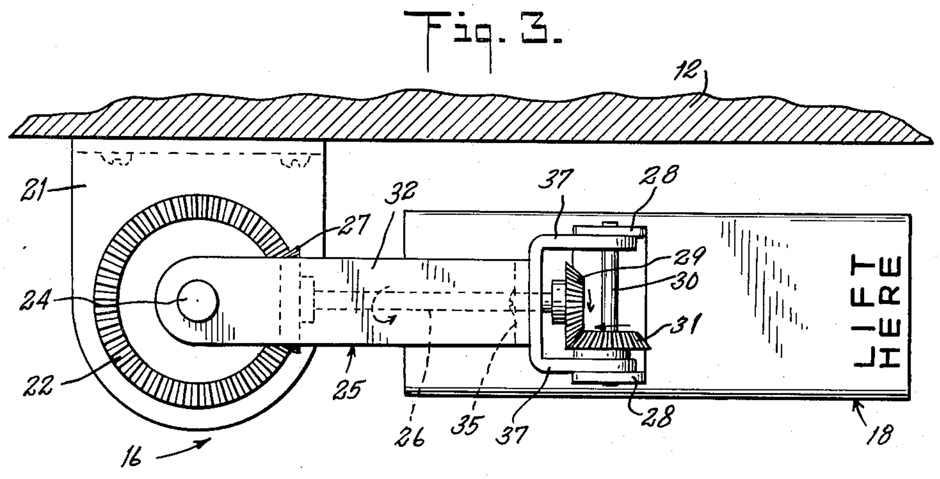
FIG. 3 is a plan view of the apparatus in accordance with the present invention as seen below the shelf.
Figure 4:
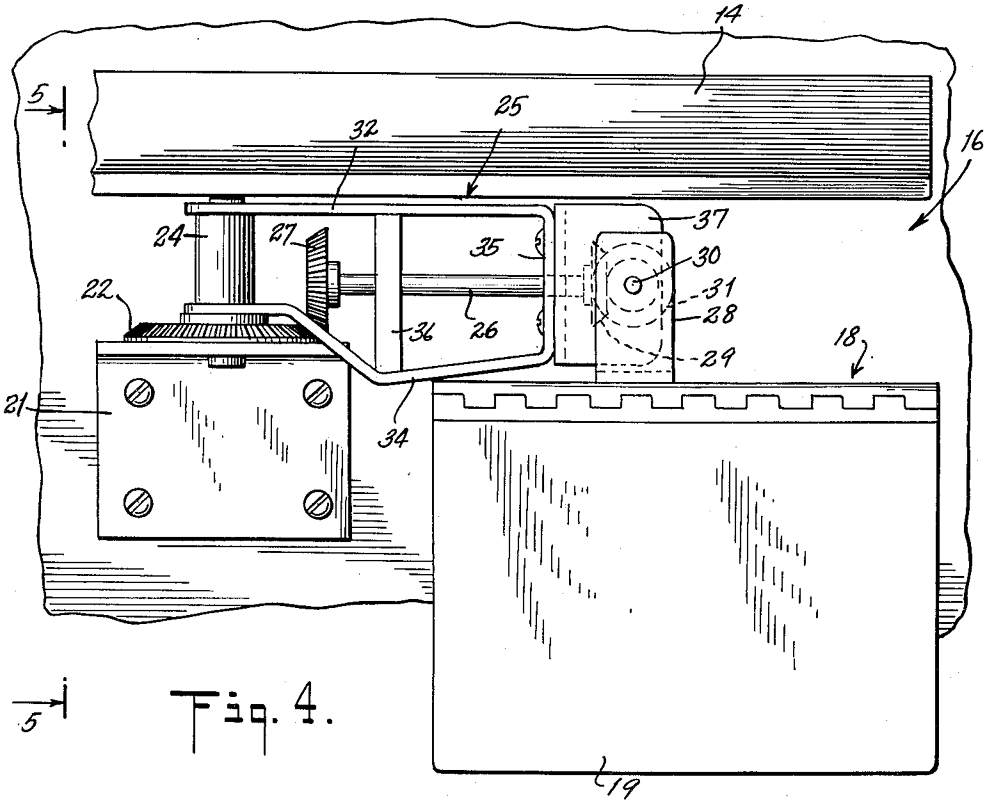
FIG. 4 is a side view of the apparatus shown in FIG. 3 with the shelf included.
Figures 5, 6:
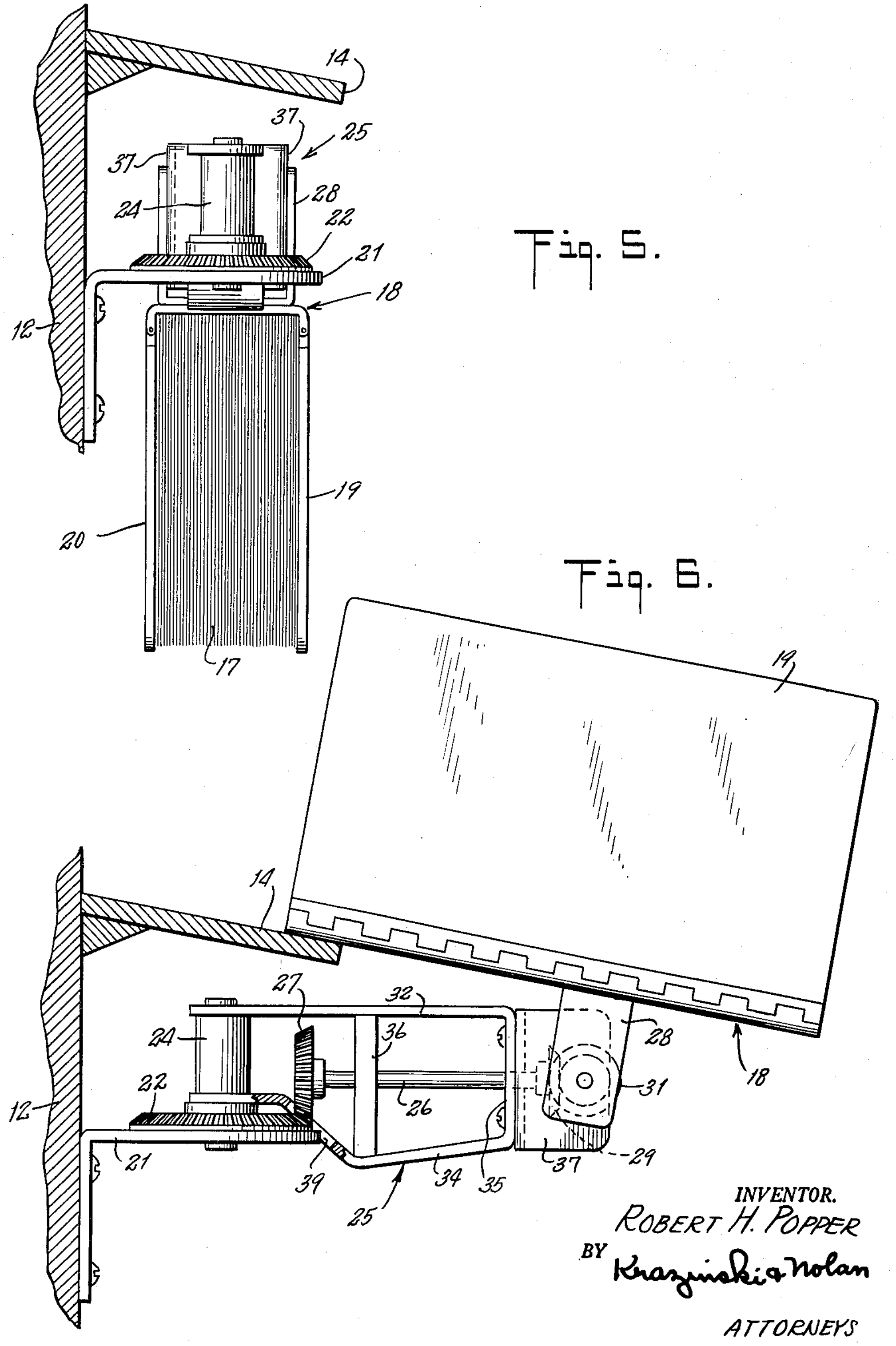
FIG. 5 is a view taken along the line 5—5 on FIG. 4.
FIG. 6 is a view similar to FIG. 5 with the directory positioned on the shelf prior to opening the same.

The gears 22, 27 and 29 are ratioed to effect rotation of the arm 25 through a predetermined arc, for example 45° upon inverting the book holder about 180° when installed as shown in FIG. 1 and 90° upon so inverting the book holder when illustrated as shown in FIGS. 2 and 3.

In operation of the book lifting apparatus 16, the book 17 is inverted rearwardly, thereby causing the gears 22, 27 and 29 to swing the arm 25 clockwise into a position perpendicular with respect to the forward edge of the shelf 14 to enable the upper portion of the book to be laid across the shelf, so that it can be fully opened and read clearly while using the telephone. The book is returned by inverting the same forwardly, whereby its weight causes the gearing to return the book to its stored position.

In view of the foregoing description, it will be seen that the present invention provides book positioning apparatus which occupies a minimum of space, enables stiff covers to protect the book, and enables the book to be fully opened to be read in a convenient location.

While the book positioning apparatus has been described in connection with telephone booths, it will be understood that such apparatus may be used in other installations.

As various changes may be made in the form, construction, and arrangement of the parts herein, without departing from the spirit and scope of the invention and without sacrificing any of its advantages, it is to be understood that all matters are to be interpreted as illustrative and not in any limiting sense.

What is claimed is:

1. A telephone booth having back and side walls; a shelf in a corner carried by a pair of said walls; a telephone directory book having a front and back cover; a book holder for said book; first means for pivotally supporting said book holder for rotation of said book in a vertical plane and for normally positioning said book with its binding facing upwardly, its bottom facing one of the walls providing the corner and one of its covers facing the other wall providing the corner; second means for mounting said first means for rotation in a substantially horizontal plane; and drive means interconnecting said first and second means to effect rotation of said second means by rotation of said book to a position with its binding facing downwardly and at least a portion thereof resting on said shelf and to effect rotation of said second means to a position whereby the top of said book faces the corner and said book can be opened while resting on said shelf.

2. A telephone booth according to claim 1, including telephone apparatus mounted above said shelf with said shelf extending outwardly beyond said telephone apparatus, whereby said telephone apparatus can be operated while viewing said book when said book is opened and is resting on said shelf.

3. In book positioning apparatus, the combination of a bracket; a book; a book holder for said book; first means for pivotally supporting said book holder for rotation of said book in a vertical plane and for normally positioning said book with its binding facing upwardly; second means on said bracket for mounting said first means for rotation in a substantially horizontal plane; and drive means interconnecting said first and second means to effect rotation of said second means by rotation of said book to a position with its binding facing downwardly and to effect rotation of said second means to a position whereby said book can be opened.

4. In book positioning apparatus, the combination of a shelf; a wall bracket beneath said shelf; a book; a book holder for said book; first means for pivotally supporting said book holder for rotation of said book in a vertical plane and for normally positioning said book with its binding facing upwardly; second means on said wall bracket for mounting said first means for rotation in a substantially horizontal plane; and drive means interconnecting said first and second means to effect rotation of said second means by rotation of said book to a position with its binding facing downwardly and resting on said shelf and to effect rotation of said second means to a position whereby said book can be opened while resting on said shelf.

5. Apparatus according to claim 4, wherein said drive means include gearing having a ratio to effect rotation of said second means about 45° upon rotating said book about 180°.

6. Apparatus according to claim 4, wherein said drive means include gearing having a ratio to effect rotation of said second means about 90° upon rotating said book about 180°.

7. In book positioning apparatus, the combination of a wall bracket having a gear secured thereon, a stud at the center of said gear, an arm having one end mounted on said stud for rotation with respect to said fixed gear, a lengthwise extending shaft journalled for rotation on said arm, a first gear at one end of said shaft in mesh with said fixed gear, a second gear at the other end of said shaft, a book holder, a shaft fixed to said book holder and rotatably supported by said arm at its free end, and a gear secured to said last mentioned shaft and in mesh with said second gear.

8. Apparatus according to claim 7, wherein said gears have a ratio to effect rotation of said arm through a predetermined arc upon inverting said book holder.

9. Apparatus according to claim 7, wherein said stud is vertical and said arm includes a substantially U-shaped member having upper and lower substantially horizontal portions each rotatably mounted on said stud at one end and having a vertical portion connecting said horizontal portions at their other end, a vertical strut connecting said upper and lower horizontal portions, said lengthwise extending shaft being journalled for rotation in said strut and said vertical portion, and a pair of spaced apart vertical portions secured on said vertical connecting portion for supporting said last mentioned shaft.

10. Apparatus according to claim 8, wherein said lower horizontal portion has an opening through which a portion of said first gear extends to mesh with said fixed gear.

References Cited in the file of this patent

UNITED STATES PATENTS

| | | |
|---|---|---|
| 1,674,975 | Lundius | June 26, 1928 |
| 2,862,329 | Guinane et al. | Dec. 2, 1958 |
| 2,937,470 | Upton | May 24, 1960 |